United States Patent [19]

Ide et al.

[11] Patent Number: 4,707,570

[45] Date of Patent: Nov. 17, 1987

[54] MANUAL INFORMATION INPUT DEVICE

[75] Inventors: Yukio Ide; Teruyuki Ohnuma; Yoshiyuki Kageyama, all of Shizuoka, Japan

[73] Assignee: Ricoh Company, Ltd., Tokyo, Japan

[21] Appl. No.: 828,823

[22] Filed: Feb. 12, 1986

[30] Foreign Application Priority Data

Feb. 12, 1985 [JP] Japan ................................ 60-25044
Feb. 12, 1985 [JP] Japan ................................ 60-25045

[51] Int. Cl.$^4$ ............................................. G08C 21/00
[52] U.S. Cl. .................................................... 178/18
[58] Field of Search ............................ 178/18, 19, 20; 200/86 R, 46, 159 B, 150 A, 211, 214

[56] References Cited

U.S. PATENT DOCUMENTS 3,911,215 10/1975 Hurst et al. ............................ 178/18
4,149,029 4/1979 Pobgee .................................... 178/18

Primary Examiner—Stafford D. Schreyer
Attorney, Agent, or Firm—Cooper, Dunham, Griffin & Moran

[57] ABSTRACT

A manual information input device allows the user to manually enter desired information using a readily available writing instrument such as a pencil rather than a specially designated input stylus such as a light pen or an electromagnetic pen. The manual information input device comprises a substrate supporting electrodes on one surface thereof, an input panel disposed in facing relation to the substrate and supporting electrodes in confronting relation to the electrodes on the substrate, a spacer disposed between the substrate and the flexible input panel and defining a closed space therebetween, and an electrically insulating material sealed in the space. The input panel is resilient. The electrodes on the substrate and the input panel jointly constitute a pixel matrix. The electrically insulating material comprises a liquid and/or a group of particles.

20 Claims, 8 Drawing Figures

MANUAL INFORMATION INPUT DEVICE

BACKGROUND OF THE INVENTION

The present invention relates to an input device for manually entering information into various systems such as computers, word processors, or facsimile transmitter/receivers.

Various manual information input or entry devices are used in connection with information-related systems such as computers and word processors and communication systems such as facsimile transmitter/receivers for directly entering desired information through a process similar to the writing process of a human hand. Such manual information input devices employ the principles of electromagnetic induction or electrostatic coupling. The conventional manual information input devices are disadvantageous in that they require special input styli such as electromagnetic pens and light pens for the entry of information.

FIG. 8 shows, by way of example, a conventional manual information input device capable of entering desired information through the use of a readily available writing instrument such as a ball-point pen, a pencil, or a fountain pen, rather than a specially designed stylus. The manual information entry device illustrated in FIG. 8 at (I), generally designated at 10, comprises a substrate 12, a resilient input panel 14, a spacer 16, and electrodes 12A, 14A.

The substrate 12 and the input panel 14 support the electrodes 12A, 14A on their one surface and are disposed with the electrodes 12A, 14A confronting each other. The spacer 16 is interposed between the substrate 12 and the input panel 14 for spacing them a given distance apart from each other. The electrodes 12A, 14A are in the form of rectangular stripes. The strip elecrrodes 12A extend parallel to each other, and the stripe electrodes 14A extend parallel to each other, whereas the stripe electrodes 12A, 14A extend perpendicularly to each other. Specifically, the stripe electrodes 12A are directed longitudinally parallel to the sheet of FIG. 8 and spaced at small intervals in a direction normal to the sheet of FIG. 8. The stripe electrodes 14A are directed longitudinally in a direction normal to the sheet of FIG. 8 and spaced at small intervals parallel to the sheet of FIG. 8.

If the images of these stripe electrodes 12A, 14A were projected onto the substrate 12, then their crossing points would be arranged as a two-dimensional matrix referred to as a pixel matrix. Stated otherwise, the electrodes 12A, 14A constitute such a pixel matrix. Assuming that the electrodes 12A are successively numbered as $1, 2, \ldots, i, \ldots, N$ and the elecrtrodes 14A are also successively numbered as $1, 2, \ldots, j, \ldots, M$, each of the pixels of the pixel matrix can be indicated as $(i, j)$ where $i=1$ through $N$, $j=1$ through $M$).

In operation, a voltage is applied between the electrodes 12A, 14A. When the input panel 14 is pushed as indicated by the arrow in FIG. 8(II) by a pointed input pen such as a ball-point pen, the input panel 14 is resiliently depressed toward the substrate 12 until a gth stripe electrode 14A, for example, is brought into electric contact with a pth stripe electrode 12A on the substrate 12. The position where the input panel 14 is pushed can be electrically identified as the combination (g, p) of the stripe electrodes thus held in contact with each other. As The input pen is moved to draw a desired pattern to be entered on the input panel 14, the position (g, p) of the pushed position is varied to enter the pattern as an electric signal representative of the time-dependent change of the position (g, p).

However, the above manual input device has the following problem: If a finger or part of a hand accidentally touches the input panel 14 while desired information is being entered, the input panel 14 is resiliently deformed to bring unwanted electrodes into electric contact with each other, resulting in entry of such an accidental touch as erroneous information which acts as noise with respect to the desired information to be entered.

SUMMARY OF THE INVENTION

In view of the aforesaid drawback of the conventional manual input device, it is an object of the present invention to provide a novel manual information input device which is arranged to be less likely to produce noise during manual entry of information.

According to the present invention, a manual information input device allows the user to manually enter desired information using a readily available pointed input stylus such as a pencil rather than a specially designed input stylus such as a light pen or an electromagnetic pen. A touch by an object having a relatively large area of contact such as part of a hand or a finger is not entered as information.

The manual information input device comprises a substrate, an input panel, a spacer, electrodes on the substrate and the input panel, and an electrically insulating material sealed in a closed space defined by the substrate, the input panel, and the spacer. The substrate and the input panel are arranged in facing relation with the electrodees on the substrate and the input panel confronting each other. The input panel is resilient, but the substrate may be resilient or rigid. The spacer is interposed between the substrate and the input panel to define the closed space therebetween.

The electrically insulating material sealed in the space comprises a liquid and/or a group of particles. The liquid and/or the group of particles are sealed either singly or in combination. When the liquid is sealed singly or in combination with the gouop of particles, the liquid fills the space.

The electrodes on the substrate and the input panel jointly constitute a pixel matrix. The electrodes on the substrate comprise parallel stripe electrodes, and the electrodes on the input panel comprise parallel stripe electrodes, the strip electrodes on the substrate and the input panel extending perpendicularly to each other. Aalternatively, the electrodes on either the substrate or the input panel may comprise a two-dimensional matrix of small electrodes, and the electrodes on the other may comprise a single planar electrode facing the small electrodes.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
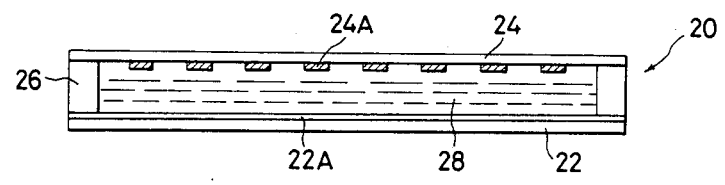
FIG. 1 is a cross-sectional view of a manual information input device according to the present invention.

A manual input device for manually entering information according to the present invention comprises a substrate, an input panel, electrodes, a spacer, and a sealed material.

The substrate may be resilient or rigid, and may generally be of a rectangular or square shape, though it may also be of a circular, elliptical, or other configuration. The substrate may be of any thickness, but should preferably be of a thickness of 50 micrometers or more and less than 10 mm to provide a required degree of mechanical strength. The substrate is required to be of an insulating material such as glass, ceramics, or synthetic resin such as polyester, polycarbonate, or vinyl chloride.

The input panel may be of the same shape as that of the substrate, and should be of a thickness ranging from 10 micrometers to 3 mm, preferably in the range of from 50 micrometers to 1 mm. The input panel is required to be of a resilient and insulating material such as a synthetic resin like polyester, polycarbonate, or vinyl chloride.

The electrodes on the substrate and the input may be of a thickness ranging from 50 angstroms to 10000 angstroms, preferably from 200 angstroms to 5000 angstroms, and may be in the form of a thin film which can be made of various metals or their compounds. Specifically, the elecrrodes may be made of $In_2O_{3-x}$, $Sn_2O_{2-x}$, ITO, NESA, CuI, Au, Pd, $In_xC_yO_z$, or $Sn_xC_yO_z$, for example. The spacer may be of any insulating material and have a thickness (which determines the gap between the confronting electrodes) ranging from 1 micrometer to 10 mm, preferably in the range of from 5 micrometers to 5 mm in order to prevent malfunctioning and provide the ease with which the spacer can be manufactured.

The sealed material may be of any insulating liquid having a boiling point of 50° C. or higher and a volume resistivity of $10^6 \Omega$ cm or more. Such an insulating material may be aliphatic hydrocarbons, aromatic hydrocarbons, halogenated hydrocarbons, alcohols, ketones, esters, alcohol esters, keton esters, ethers, keton alcohols, keton ethers, ester ethers, pure water, or their mixtures, In particular, saturated hydrocarbons such as $C_6$ through $C_{13}$, their mixtures, or pure water are suitable for use as the insulating material in view of their vapor pressure, toxicological properties, and ease of handling.

The sealed material may be of a group of particles which may be of any shape, but should generally and practically be of a spherical or similar shape. Each of the particles may be hollow or porous, and should be of a size smaller than the thickness of the space defined between the spacer. The diameter of each particle (which is the dimension representative of the particle size, e.g., the average particle diameter) should preferably be in the range of from 0.1 micrometer to 2 mm, preferably from 1 micrometer to 500 micrometers. The particles may be of an insulating material such as glass, MMA, polyethylene, vinyl chloride, alumina, silica, zirconia, carbon, pumice powder, alumino-silicate, magnesia spinel, pearlite, or fly ash, for example. The particle should preferably be of a volume resistivity of $10^6$ ohm cm or more.

If the insulating liquid and the group of particles are sealed together, various additives may be added to the liquid to improve the dispersion properties of the particles.

A protective layer may be coated on the surface of the input panel as part thereof in order to make the input panel surface resitant to wear and capable of preventing light reflection, as required. The protective layer should preferably be of transparent ceramics, $SiO_2$, SiC, or $Si_3N_4$, and a carbon-evaporated thin film.

The present invention will hereinafter be described with reference to the drawings.

FIG. 1 shows a cross-sectional view of a manual information input device 20 according to the present invention. The manual information input device 20 comprises a substrate 22, an input panel 24, a spacer 26, electrodes 22A, 24A, and a sealed material 28 comprising a liquid.

The electrodes 22A are disposed on the substrate 22, and the electrodes 24A are disposed on th input panel 24. The electrodes 22A comprise parallel stripe electrodes, and the electrodes 24A also comprise parallel stripe electrodes, the electrodes 22A, 24A extending perpendicularly to each other to provide a pixel matrix. The stripe electrodes 24A extend longitudinally in a direction normal to the sheet of FIG. 1.

The spacer 26 is interposed between the substrate 22 and the input panel 24 to keep them a prescribed distance apart from each other and cooperate with the substrate 22 and the input panel 24 in defining a closed space. The liquid 24 is sealed in the closed space so as to fill the space.

Operation of the manual information input device 20 shown in FIG. 1 will be described with reference to FIGS. 2 and 3.

Figure 2:
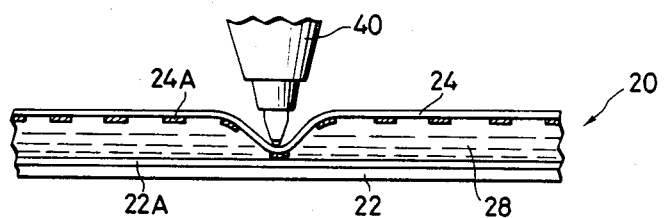
FIGS. 2 and 3 are fragmentary cross-sectional views each showing how the manual information input device of FIG. 1 is used.

When a pointed input stylus such as a ball-point pen 40 or a pencil is used to push the input panel 24 as shown in FIG. 2, the input panel 24 is easily deformed resiliently to bring the electrodes 22A, 24A into mutual electrical contact since the input stylus has a pointed end and can impose a large force on the input panel 24 where it is contacted by the input stylus even if the input stylus is lightly depressed. Accordingly, information can easily and reliably be entered manually with the input stylus.

Figure 3:
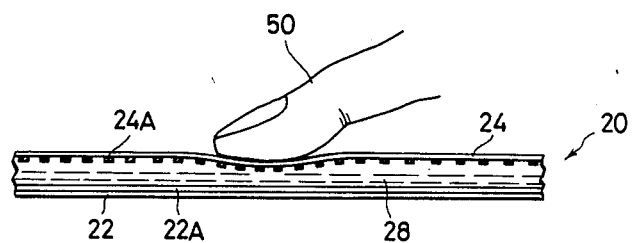

When the input panel 24 is pushed by a finger 50, for example, as shown in FIG. 3, however, the force exerted by the finger is scattered over the area of the input panel 24 which is contacted by the finger 50 since the area of contact is relatively large. The force transmitted from the area of contact is uniformly scattered by the liquid 28 into the closed area, but not concentrated on the pushed region. Therefore, the electrodes 22A, 24A will not be brought into mutual electrical contact. Consequently, even when the input panel 24 is touched by a finger or a hand having a relatively large area of contact, such a touch is not entered as information.

One example of the arrangement shown in FIG. 1 will be described.

The substrate 22 was formed of a rectangular glass sheet having a thickness of 1.1 mm and a size of 110 mm×140 mm. The electrodes 22A were fabricated of ITO on one surface of the substrate 22 in the form of parallel stripe electrodes. The stripe electrodes 22A were 100 mm long each, 0.4 mm wide each, and spaced 0.2 mm from adjacent ones, the number of the stripe electrodes 22A being 160.

The input panel 24 was formed of a polyester film having a thickness of 0.1 mm with the same size and shape as that of the substrate 22. The electrodes 14A were fabricated of ITO on one surface of the input panel 24 as parallel stripe electrodes. The stripe electrodes 24A were 100 mm long each, 0.4 mm wide each, and spaced 0.2 mm from adjacent ones, the number of the stripe electrodes 24A being 160. The stripe electrodes 24A extended longitudinally in a direction perpendicular to the longitudinal direction of the stripe electrodes 22A, so that the stripe electrodes 22A, 24A provide a pixel matrix.

The spacer 26 was also made of a polyester film having a thickness of 0.1 mm.

The liquid 28 sealed was isoparaffin of $C_{10}$.

When a ball-point pen, a pencil, a fountain pen, and a pointed wood rod were used as input styli to manually enter information, noise-free information could be entered. When a finger, a palm, and a finger joint were used to push the input panel, such a touch could not be entered as information.

The manual input device was placed over a liquid crystal display device. Since the entire manual input device is transparent, a hand-written pattern entered through the manual input device and displayed on the liquid crystal display device could be viewed through the manual input device. Where the manual information input device is made transparent as a whole as described above, it can be placed over various display devices and used in combination therewith.

Figure 4:
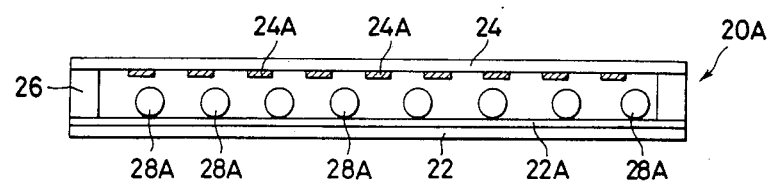
FIG. 4 is a cross-sectional view of another manual information input device according to the present invention.

FIG. 4 shows another cross-sectional view of a manual information input device according to the present invention. Those parts in FIG. 4 which are identical to those shown in FIG. 1 are denoted by the identical reference characters.

The input device, denoted at 20A, of FIG. 4 differs from the input device 20 of FIG. 1 in that a group of electrically insulating particles 28A are sealed in the input device 20A.

The particles 28A sealed in the space in the input device 20A may be freely movable in the space, or fixed by an adhesive to the substrate 22 or the input panel 24.

Figure 7:
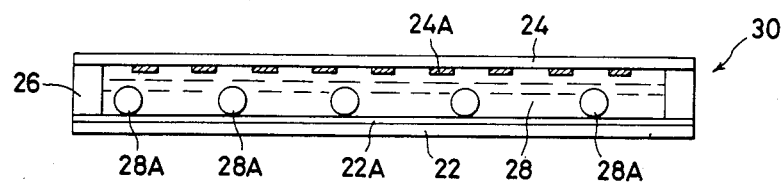
FIG. 7 is a cross-sectional view of still another manual information input device according to the present invention.
Figure 8:
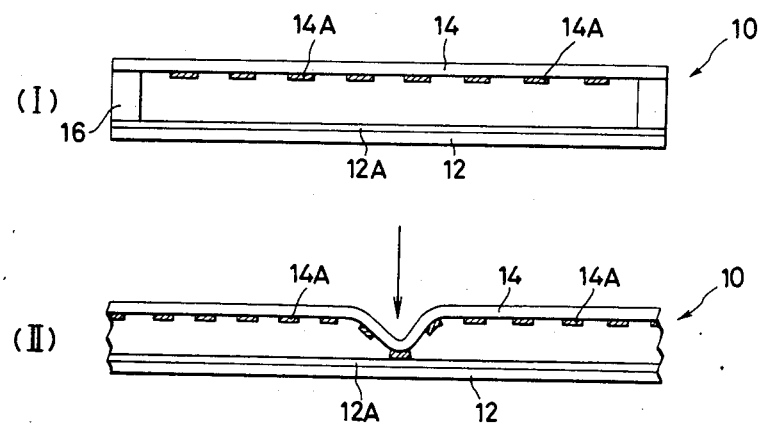
FIG. 8, views I and II are a cross-sectional view of a conventional manual information input device, explaining the problem to be solved by the present invention.

FIG. 7 shows still another manual information input device according to the present invention. Those parts in FIG. 7 which are identical to those shown in FIG. 1 are denoted by the identical refeence characters.

The input device, denoted at 30, of FIG. 7 differs from the input device 20 of FIG. 1 in that a group of electrically insulating particles 28A are sealed in the input device 20 and an electrically insulating liquid 28 is sealed in and fills up the space in the input device 30.

Operation of the manual information input device 20A shown in FIG. 4 will be described with reference to FIGS. 5 and 6.

Figure 5:
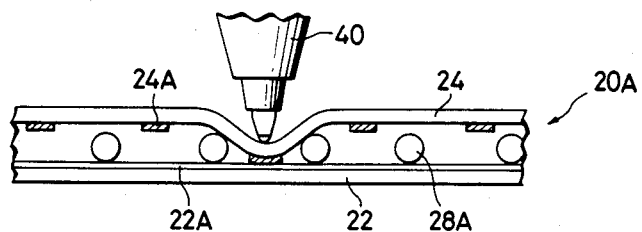
FIGS. 5 and 6 are fragmentary cross-sectional views each showing the manner in which the manual information input device of FIG. 4 is used.

When the input panel 24 is pushed by an input stylus such as a pointed writing instrument, e.g., a ball-point pen, as shown in FIG. 5, the input panel 24 is easily deformed resiliently to bring electrodes 22A, 24A into electrical contact with each other to enter such a depressing touch as information.

Figure 6:
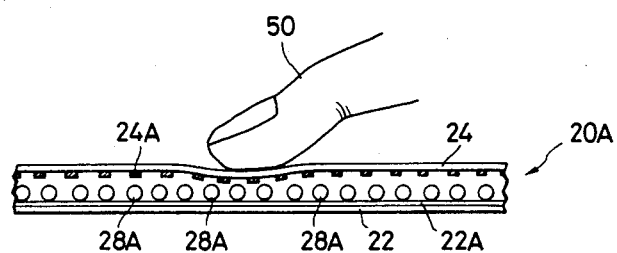

When the input panel 24 is pushed by a finger, for example, as shown in FIG. 6, however, the particles 28A prevent the electrodes 22A, 24A from contacting each other because the area through which the input panel 24 is depressed is relatively large. Thus, a touch by the finger 50 is not entered as wrong information. This holds true for the input device 30 illustrated in FIG. 7. The average spacing between adjacent particles 28A should be larger than the size of the pointed end of the input stylus, but sufficiently smaller than the size of the finger or the like. This average spacing range is effective in determining an appropriate range of densities of the particles 28A in the space in the input device 20A or 30.

Examples of the manual information input devices 20A, 30 shown in FIGS. 4 and 7 will be given below.

The substrate 22 was formed of a rectangular glass sheet having a thickness of 1.1 mm and a size of 110 mm×140 mm. The electrodes 22A were fabricated of ITO on one surface of the substrate 22 in the form of parallel stripe electrodes. The stripe electrodes 22A were 100 mm long each, 0.4 mm wide each, and spaced 0.2 mm from adjacent ones, the number of the stripe elecrodes 22A being 160.

The input panel 24 was formed of a polyester film having a thickness of 0.1 mm in the same size and shape as that of the substrate 22. The electrodes 24A were fabricated of ITO on one surface of the input panel 24 as parallel stripe electrodes. The stripe electrodes 24A were 100 mm long each, 0.4 mm wide each, and spaced 0.2 mm from adjacent ones, the number of the stripe electrodes 24A being 160. The stripe electrodes 24A extend longitudinally in a direction perpendicular to the longitudinal direction of the stripe electrodes 22A, so that the stripe electrodes 22A, 24A provide a pixel matrix.

The spacer 26 was also made of a polyester film having a thickness of 0.05 mm.

The particles 28A were made of pearlite as spherical particles each having a diameter of about 10 micrometers. The particles 28A were sealed in a closed space defined by the substrate 22, the input panel 24, and the spacer 26 at a density of 10 through 20 particles/mm$^2$, thus completing a manual information input device arranged as shown in FIG. 4.

A manual information input device as shown in FIG. 7 was prepared by sealing isoparaffing ($C_{10}$) as an electrically insulating liquid together with the above particles 28A in the space in another manual information input device of FIG. 4 which was prepared as described above.

Still another manual information input device constructed as shown in FIG. 4 was also prepared by using a substrate of glass having a thickness of 1.1 mm and an input panel of polyester film having a thickness of 100 micrometers, forming 160 stripe electrodes, 0.4 mm wide and 100 mm long, on each of the glass substrate and the polyester film input panel at a spacing of 0.2 mm, employing a polyester spacer having a thickness of 50 micrometers, and sealing a group of particles of MMA having a diameter of 23 micrometers in the space at a dispersion ratio of 10 through 20 particles/mm$^2$.

When a ball-point pen, a pencil, a fountain pen, and a pointed wood rod were used as input styli to manually enter information through these manual information input devices, noise-free information could be entered well and reliably. When a finger, a palm, a finger joint, and a elbow were used to push the input panel, such a touch could not be entered as information.

The manual information input devices were placed over liquid crystal display devices. Since the manual information input devices are entirely transparent, a hand-written pattern entered through the manual information input devices and displayed on the liquid crystal display devices could be viewed through the manual information input devices. Where the manual information input device is made transparent as a whole as described above, it can be placed over various display devices so that an input pattern displayed on the display device can be observed through the manual information input device.

The manual information input device thus constructed according to the present invention does not require use of aspecially designed input stylus such as an electromagnetic pen or a light pen, but allows the user to enter desired information easily and reliably using a readily available writing instrument such as a ball-point pen or a pencil, while preventing a finger touch or the like from being entered as wrong information. The manual information input device can be used as an on-off switch device by forming single planar electrodes respectively on the substrate and the input panel.

Although certain preferred embodiments have been shown and described, it should be understood that many changes and modifications may be made therein without departing from the scope of the appended claims.

What is claimed is:

1. A manual information input device comprising:
   a substrate supporting electrodes on one surface thereof;
   a resilient input panel disposed in facing relation to said substrate and supporting electrodes in confronting relation to said electrodes on the substrate;
   a spacer disposed between said substrate and said flexible input panel and defining a closed space therebetween;
   an electrically insulating, flowable, viscous material sealed in said space;
   said electrodes on said substrate and said input panel jointly constituting a pixel matrix; and
   said electrically insulating material comprising a group of particles and/or a liquid, said liquid filling said space when it is sealed in said space either singly or in combination with said group of particles.

2. A manual information input device according to claim 1, wherein said input panel has a thickness ranging from 10 micrometers to 3 mm.

3. A manual information input device according to claim 1, wherein each of said electrodes on said substrate and said input panel has a thickness ranging from 50 angstroms to 10,000 angstroms.

4. A manual information input device according to claim 1, wherein said electrodes on said substrate comprise parallel stripe electrodes and said electrodes on said input panel comprise parallel stripe electrodes, said stripe electrodes on said substrate and said input panel extending perpendicularly to each other thereby to provide said pixel matrix.

5. A manual information input device according to claim 1, wherein the electrodes on one of said substrate and said input panel comprise a two-dimensional matrix of small electrodes, and the electrodes on the other of said substrate and said input panel comprise a single planar electrode facing said small electrodes.

6. A manual information input device according to claim 1, wherein said electrically insulating material comprises said liquid having a boiling point of at least 50° C. and a volume resistivity of at least $10^6 \Omega$ cm.

7. A manual information input device according to claim 1, wherein said electrically insulating material comprises said group of particles each having a diameter ranging from 0.1 micrometers to 2 mm.

8. A manual information input device according to claim 1, wherein said electrically insulating material comprises said group of particles each having a diameter ranging from 0.1 micrometers to 2 mm and said liquid having a boiling point of at least 50° C. and a volume resistivity of at least $10^6 \Omega$ cm.

9. A manual information input device comprising:
   a substrate and a resilient input panel which are substantially coextensive and parallel but spaced from each other to define an interior space between them;
   first electrodes which are supported on the substrate and face the panel and second electrodes which are supported on the panel and face the substrate, wherein said first and second electrodes are normally out of electrical contact with each other;
   electrically insulating, viscous flowable material which is enlcosed in said interior space between the substrate and panel and (i) comprises electrically insulating particles having a dispersion rate greater than 10 particles per square mm and size of 0.1 micrometes to 2 mm, and (ii) has flow properties which allow the material to flow away from the pressed area when the panel is pressed toward the substrate with a pointed instrument to permit ohmic contact between a first electrode and a second electrode but not when the input panel is pressed toward the substrate with a user's hand or finger.

10. A manual inforamtion input device as in claim 9 in which the flowable material is a viscous liquid.

11. A manual information input device as in claim 9 in which the flowable material is a liquid and said particles are solid and are suspended therein but not affixed to the input panel or to the substrate, and the particle size is from 1 to 500 micrometers.

12. A manual information input device as in claim 9 in which the boiling point of the flowable material is equal to or greater than 50° C.

13. A manual information input device as in claim 12 in which the volume resistivity of the flowable material is equal to or greater than $10^6$ ohm-cm.

14. A manual information input device as in claim 9 in which the substrate, the flowable material, the input panel and the electrodes are transparent.

15. A manual information input device as in claim 9 in which the flowable material comprises isoparaffin.

16. A manual information input device as in claim 9 in which the flowable material comprises pearlite particles suspended in said isoparaffin.

17. A manual information input device as in claim 16 in which the substrate comprises a glass plate and the input panel comprises a polyester film.

18. A manual information input device as in claim 17 in which the particles have a diameter of about 23 micrometers and have a dispersion ratio of about 20 particles per square mm.

19. A manual information input device comprising:

a substrate and a resilient input panel which are substantially coextensive and parallel but spaced from each other to define an interior space between them;

first electrodes which are supported on the substrate and face the panel and second electrodes which are supported on the panel and face the substrate, wherein said first and second electrodes are normally out of electrical contact with each other;

electrically insulating, non-gaseous material which is enclosed in said interior space between the substrate and panel but is not affixed to the substrate or panel and flows away from the pressed area when the panel is pressed toward the substrate with a pointed instrument to permit ohmic contact between a first electrode and a second electrode but not when the input panel is pressed toward the substrate with a user's hand or finger, said material comprising electrically insulating particles having a dispersion rate greater than 10 particles/mm$^2$ and size of between 0.1 micrometer and 2 mm.

20. A manual information input device as in claim 19 in which the flowable material is a liquid with said particles suspended therein.

* * * * *